United States Patent [19]

Bracke et al.

[11] 4,145,376

[45] Mar. 20, 1979

[54] HIGH IMPACT POLYSTYRENE COMPOSITION

[75] Inventors: William J. I. Bracke, Hamme; Jean N. M. Bertrand, Tervuren; Jacques T. L. Zegers, Brussels, all of Belgium

[73] Assignee: Labofina S. A., Brussels, Belgium

[21] Appl. No.: 734,002

[22] Filed: Oct. 20, 1976

[51] Int. Cl.$^2$ ............................................ C08L 53/02
[52] U.S. Cl. .............................. 260/876 B; 260/877; 260/879; 260/880 R; 260/880 B; 260/886; 260/892; 260/894
[58] Field of Search ................ 260/876 B, 876 R, 894

[56] References Cited

U.S. PATENT DOCUMENTS

| | | | |
|---|---|---|---|
| 3,678,134 | 7/1972 | Middlebrook | 260/876 B |
| 3,689,595 | 9/1972 | Gwinn | 260/876 B |
| 3,766,114 | 10/1973 | Walker et al. | 260/28.5 B |
| 3,906,057 | 9/1975 | Durst | 260/876 B |
| 3,907,930 | 9/1975 | O'Grady | 260/870 B |
| 3,907,931 | 9/1975 | Durst | 260/876 B |
| 3,936,365 | 2/1976 | Saunders et al. | 204/159.2 |
| 4,048,254 | 9/1977 | Hillier et al. | 260/859 R |

*Primary Examiner*—Thomas DeBenedictis
*Attorney, Agent, or Firm*—Robert J. Koch

[57] ABSTRACT

A composition comprising a mixture of a styrene polymer, a rubbery dienic polymer and a sequenced copolymer of styrene and a diene, the total styrene polymer content which includes the free polystyrene and the polystyrene present in the sequenced copolymer is between 50 and 99% by weight of the composition, the total rubber content, which include the rubbery dienic polymer and the dienic polymer present in the sequenced copolymer, is between 1 and 50% by weight of the composition, the amount of sequenced copolymer being such as to bring to the composition from 3 to 90% by weight of the total rubber in the composition.

6 Claims, No Drawings

HIGH IMPACT POLYSTYRENE COMPOSITION

BACKGROUND OF THE INVENTION

The present invention relates to vinyl aromatic polymer compositions having improved impact strength properties. Further, the present invention relates to a process for preparing said compositions by mixing of the different constituents.

It is well known that resins obtained from polystyrene as sole constituent have a low impact strength. In order to improve that property, the polystyrene which is hard and rigid, is combined with a rubber which is flexible and elastic. Two processes may be utilized to combine the polystyrene and rubber. One of these processes involves physically mixing polystyrene and rubber. However, the compatibility of the polystyrene and rubber is low and generally mixing results in the rubber being poorly dispersed in the polystyrene. Rubber agglomerates are more or less finely divided into the polystyrene mass, and the properties of the polystyrene are only slightly improved. In order to significantly increase the impact strength by mixing rubber and polystyrene, a high rubber content is needed. However, in adding high rubber amounts, other desirable properties of polystyrene are unfavorably influenced.

The other method of combining rubber and polystyrene is by grafting styrene on rubber. This method, which generally comprises a bulk polymerization followed by a suspension polymerization, requires high investments. Moreover, the grafting process has limitations particularly with respect to the density and quality of the grafting.

Compositions comprising a vinylaromatic polymer, 1,4 polybutadiene or a statistic polymer of butadiene-styrene (such as GRS) are also known. However, the impact strength properties of such compositions are as good as is often required. Other compositions of thermoplastic resins obtained by mixing a homopolymer or a copolymer of styrene with a sequenced copolymer of styrene and butadiene are known but the impact strength properties of these compositions also do not meet many needs. The feature of this type of composition resides in the fact that the whole rubber present in the resin is grafted. However, if a maximum degree of graft improves tensile strength and bending strength properties, the results show that it bears the impact strength properties.

It is an object of the present invention to provide new and improved high impact polystyrene compositions.

Another object of the present invention is to provide a new and improved high impact polystyrene prepared by mixing.

Still another object of the present invention is to provide a process for mixing the materials necessary to prepare the new and improved high impact polystyrene compositions defined herein.

Additional objects will become apparent from the following description of the invention herein described.

SUMMARY OF THE INVENTION

It has now been found that when one prepares a composition by mixing a rubbery dienic polymer, a vinylaromatic polymer and a sequenced copolymer, the composition obtained has greatly improved impact strength properties in comparison with compositions of similar rubber content.

The composition of the present invention comprises a mixture of a styrene polymer, a rubbery dienic polymer and a sequenced copolymer of styrene and a diene, the total styrene polymer content which includes the free polystyrene and the polystyrene present in the sequenced copolymer is between 50 and 99% by weight of the composition, the total rubber content, which includes the rubbery dienic polymer and the dienic polymer present in the sequenced copolymer, is between 1 and 50% by weight of the composition, the amount of sequenced copolymer being such as to bring to the composition from 3 to 90% by weight of the total rubber in the composition.

In another embodiment, the present invention is a process for preparing the above described compositions. Such process comprises mixing in conventional manner, a styrene polymer, a rubbery dienic polymer, a sequenced copolymer of styrene and a diene. A peroxide and/or usual additives may also be so mixed into the composition. The total styrene polymer content based on the polystyrene polymers and the polystyrene present in the sequenced copolymer, being between 50 and 99% by weight of the composition, the total rubber content based on the rubbery dienic polymer and the dienic polymer present in the sequenced copolymer, being between 1 and 50% by weight of the composition, the sequenced copolymer content being such as to bring to the composition from 3 to 90% by weight of the total rubber in the composition. The peroxide content if such is mixed, is no more than 0.5% by weight of the composition. If the usual additives are employed, the content is not more than 50% by weight of the composition.

DESCRIPTION OF THE PREFERRED EMBODIMENTS

According to the present invention, the vinylaromatic polymers are homopolymers prepared from styrene and copolymers prepared from styrene and its derivatives such as styrene halides and alkylstyrenes. The polystyrene content in the final composition may vary between wide limits and depends on the properties which are desired for the final composition. It is well known that the impact strength increases with the rubber content, but the tensile strength and bending strength properties are worse at high rubber content. Therefore, it is preferable that the polystyrene content varies between 50 and 99% by weight, based on the total weight of the composition and particularly between 70 and 95% by weight. The polystyrene content is based on the styrene polymer present as a polystyrene plus that contained in the sequenced copolymer.

The rubbery dienic polymer generally consists of a 1,4 diene polymer, particularly polybutadiene, polyisoprene or mixtures thereof. Statistic copolymers of styrene and butadiene may also be used alone or in combination with the rubbery dienic polymer. Generally, the rubber content is between 1 and 50% by weight, based on the total weight of the composition, and preferably between 5 and 30% by weight. The rubber content includes that present in a homopolymer (dienes), a statistical polymer (GRS) and the sequenced copolymer. It is well known that the rubber content depends on the desired properties. Indeed, for a high rubber content, the impact strength properties of the compositions are greatly improved but to the detriment of the other physical properties such as tensile strength and bending strength. Moreover, for a high rubber content, the mixing of the constituents becomes more difficult and to obtain a uniform mixture becomes very difficult. Therefore, the optimum rubber content is selected with a view toward obtaining sufficient impact strength properties while limiting retaining other properties satisfactory.

The main role of the sequenced copolymer is to bring about the formation of a homogeneous dispersion of the rubbery polymer into polystyrene and to promote a good attachment of the rubber phase into the polystyrene phase. In order to fulfill those conditions, the sequenced copolymer contains at least a polystyrene chain and at least a diene polymer chain, and it may be of the di-block type A-B or of the ter-block type A-B-A or B-A-B wherein A is a polystyrene chain and B is a polybutadiene chain, or still of the radial type, or their mixtures. A radial copolymer may be represented as being constituted of at least 3 branches of a di-block copolymer, each branch comprising a segment of diene polymer with at an extremity a segment polystyrene. The other extremity is linked to other similar branches. Such a block copolymer may be prepared according to the process described in the U.S. Pat. No. 3,281,383.

The quality of the compositions of the invention depends on the molecular weight and on the composition of the sequenced polymer and also on its content in the final composition. Particularly advantageous results are obtained when the sequenced copolymer comprises polystyrene chains and diene polymer chains, each having a molecular weight of at least 5,000 and which does not exceed 1,000,000. The weight ratio of polystyrene to rubber is the sequenced polymer generally is between 0.2 and 5. A sequenced copolymer being too low in polystyrene or rubber content acts as pure polystyrene or pure rubber and not as a dispersing agent.

The sequenced copolymer such as hereabove defined, is used in an amount such that it provides from 3 to 90% by weight of the total rubber in the composition.

A peroxide also may be added in order to improve the linkage of the rubber and therefore to improve the impact strength properties of the composition. The choice of the peroxide depends on the operating conditions and mainly on the temperature, the residence time in the mixer, and on the mixer type. Exemplary of useful peroxides are cumyl hydroperoxide, tert-butyl hydroperoxide, dicumyl hydroperoxide, etc. The amount of peroxide useful to improve the linkage of the rubber particles generally does not exceed 0.5% by weight based on the total weight of the composition.

The composition of the invention may also contain one or more additives normally present in the polystyrene based compositions. The additives are for instance, anti-oxidizing agents, lubricating agents, dyeing matters, inert fillers, fire-proofing agents and anti-static agents.

The method of mixing which forms a part of the present invention, comprises mixing by conventional methods such as by extrusion, the components described above in amounts specified above. With regard to the classical suspension polymerization process, this type of process presents the advantage of avoiding the use of a suspension agent and of suppressing the necessity of purifying the waters before and after the reaction. Moreover, the mixing process allows a wide latitude with respect to the operating conditions. With respect to mixing, many factors may vary, such as for instance, temperature, residence time in the mixer, shearing intensity, viscosity, nature of the sequenced copolymer, chain length of the sequenced copolymer, the amount and the nature of the cross-linking agent. Moreover, this mixing process is much more simple and permits avoidance of suspension problems, bead drying and problems regarding the introduction of the various additives.

The mixing process generally is carried out by the use of mechanical mixing wherein the compounds are in a melt state. This mixing may be carried out in the presence of a solvent, which is subsequently eliminated. This solvent may be styrene monomer resulting from the residual styrene contained in the crystal polystyrene. The intensity of mixing and the mixing time will depend on the materials used and on the degree of homogenity desired for the mixture. The various compounds may be simultaneously or separately introduced into the mixer, since the order of addition has no significant influence on the physical properties of the final composition.

In one of its embodiments, the compositions of the present invention may be prepared according to a continuous process which comprises using a double screw extruder having a heating system, the extruder being continuously fed with fluid polystyrene or polystyrene beads, rubber and the sequenced copolymer, in the proportions hereabove defined.

The factor which is most significant in influencing the impact strength of the compositions of the present invention is the presence in the composition of a sequenced polymer as Table I herebelow shows it. This improvement is noticeable for any amount of rubbery polymer already present. In this Table I and in the following tables, the amounts of the different constituents are expressed in parts by weight.

For the experiments described below (except as otherwise stated), a sequenced copolymer of styrene and butadiene, in which the polystyrene part has a molecular weight of $10^5$, and the polybutadiene part has a molecular weight of $5 \times 10^4$, is used. The total polybutadiene and total polystyrene content comprises that of polybutadiene and respectively polystyrene, used as constituents of the mixture and that of polybutadiene or polystyrene present in the sequenced polymer.

The impact strength has been determined, not only in accordance with the method of the notched bar, or Izod value, described in ASTM D 256, but also in accordance with the Falling Dart method, described in ASTM D 3029-72, but on plates having 2 mm thickness, the size of the extremity of the weight being 12.7 mm. This latter modification better represents the impact conditions to which a molded material may be practically subjected.

TABLE I

| Polystyrene | 90 | 88 | 85 | 83 | 70 | 66 |
|---|---|---|---|---|---|---|
| Polybutadiene | 10 | 9 | 15 | 14 | 30 | 28 |
| Sequenced copolymer | 0 | 3 | 0 | 3 | 0 | 6 |
| Dicumyl peroxide | 0 | 0 | 100 | 100 | 200 | 200 |
| Total polybutadiene | 10 | 10 | 15 | 15 | 30 | 30 |
| Total polystyrene | 90 | 90 | 85 | 85 | 70 | 70 |
| Izod (Ft lb/inch) | 0.59 | 1.2 | 0.99 | 3.95 | 2.45 | 6.3 |
| Falling Dart (inch/lb) | 1 | 1 | 1 | 4 | 7 | 37.5 |

From this above Table I, it may be seen that the introduction of the sequenced copolymer significantly improves the impact strength by both the notched bar (Izod) than the Falling Dart impact strength measurements. This result is unexpected because if the sequenced copolymer is added only to the polystyrene, the impact strength of such composition is no higher than that of a composition containing polystyrene and polybutadiene, and in some cases, the impact strength is even lower, as Table II shows it.

TABLE II

| Polystyrene | 90 | 83.34 |
|---|---|---|
| Polybutadiene | 10 | 0 |
| Sequenced radial copolymer (60% butadiene - 40% styrene) | 0 | 16.66 |
| Total polybutadiene | 10 | 10 |
| Total polystyrene | 90 | 90 |
| Izod (ft lb/inch) | 0.59 | 0.46 |

The amount of sequenced copolymer also influences the Falling Dart impact strength, this impact strength increasing with the sequenced copolymer content as Table III shows it herebelow:

TABLE III

| Polystyrene | 89.34 | 88 | 87.33 |
|---|---|---|---|
| Polybutadiene | 9.66 | 9 | 8.67 |
| Sequenced styrene-butadiene | 1 | 3 | 4 |
| Total polybutadiene | 10 | 10 | 10 |
| Total polystyrene | 90 | 90 | 90 |
| Falling Dart (inch/lb) | 1 | 4.5 | 16 |

The results set forth above, particularly in Tables II and III, show that the three compounds of the mixture of the present invention are necessary to obtain the desired properties.

The impact strength properties of the mixtures of the invention also depend on various other factors such as type of sequenced copolymer, type of rubbery polymer, and also on operating conditions such as extrusion temperature, and mixing time. However, these different factors act according to a complex manner on the mechanical properties, and it may be noticed that if the most important effect is the characteristic increase of the impact strength, the other properties are also influenced. Therefore, there is presented the possibility to prepare compositions in accordance with the present invention where not only impact strength but also, other mechanical properties are improved.

The following examples show the influence of the different factors together with their interactions on the different properties of the compositions. For instance, the mechanical properties are influenced by the type of sequenced copolymer and by the amount of styrene contained in the sequenced copolymer. The following example shows a comparison between two mixtures having a total polybutadiene content of 30% by weight but wherein the sequenced copolymers are, respectively, a copolymer of styrene and butadiene, the molecular weights of the polystyrene chains and the polybutadiene chains being respectively $2 \times 10^5$ and $7.5 \times 10^4$, and a radial copolymer containing 60% butadiene and 40% styrene, having a total molecular weight of 160,000, these copolymers being present in an amount corresponding to 20% by weight based on the total weight of polybutadiene.

|  | A | B |
|---|---|---|
| Polystyrene | 65.64 | 67.6 |
| Polybutadiene | 28.36 | 26.4 |
| Sequenced copolymer | 6 | 6 |
| Total polybutadiene | 30 | 30 |
| Izod (ft lb/inch) | 5.91 | 4.95 |
| Tensile strength (psi) (ASTM D 638) | 2007 | 2307 |
| Bending strength (psi) (ASTM D 790) | 4615 | 5148 |
| Elongation (%) | 32 | 30 |

It appears that the molecular weight of the chains must not be too high. The following example shows the comparison between two mixtures having a total polybutadiene content of 30% by weight but wherein the sequenced copolymers are, respectively, a copolymer of styrene and butadiene wherein the molecular weights of the polystyrene chains and of the polybutadiene chains are, respectively, $10^5$ and $5 \times 10^4$ and a copolymer of styrene and butadiene wherein the molecular weights of the polystyrene chains and of the polybutadiene chains are respectively $2 \times 10^5$ and $7.5 \times 10^4$.

|  | A | B |
|---|---|---|
| Izod (ft lb/inch) | 6.3 | 5.91 |
| Tensile strength (psi) | 2220 | 2007 |
| Bending strength (psi) | 5160 | 4615 |
| Elongation (%) | 32 | 32 |

Ter block copolymers of the S-B-S or B-S-B type may also be used and the properties obtained with this type of sequenced copolymer are similar to those obtained with the di-block S-B.

The properties of the mixtures of the present invention also are influenced by the type of rubbery polymer employed. Among the rubbery polymers which may be used are the normal 1,4 polybutadiene or a high-cis polybutadiene, or a statistic copolymer of butadiene and styrene. However, the influence of the rubber varies with the type of sequenced copolymer to which it is mixed and with the type of polystyrene used. The following examples show a comparison between mixtures having a total polybutadiene content of 10% by weight:

| | | | | | | |
|---|---|---|---|---|---|---|
| Soft crystal polystyrene | 89.2 | 89.2 | 88.66 | | 88.66 | 88.66 |
| Hard crystal polystyrene | | | | 88.66 | | |
| 1,4 polybutadiene | 8.8 | | 9.33 | 9.33 | | |
| Statistic copolymer butadiene (75-25) | | 8.8 | | | 9.33 | |
| High-cis 1,4 polybutadiene | | | | | | 9.33 |
| Radial sequenced copolymer (60% butadiene - 40% styrene) | 2 | 2 | | | | |
| Sequenced copolymer styrene-butadiene ($10^5 - 5 \times 10^4$) | | | 2 | 2 | 2 | 2 |
| Total polybutadiene in the composition | 10 | 10 | 10 | 10 | 10 | 10 |
| Total polystyrene in the composition | 90 | 90 | 90 | 90 | 90 | 90 |
| Izod (ft lb/inch) | 1.40 | 0.5 | 2.40 | 2.86 | 0.6 | 1.32 |
| Tensile strength (psi) | 3200 | 2980 | 3280 | 4270 | 3140 | 3800 |
| Bending strength (psi) | 7230 | 7350 | 7840 | 9300 | 7600 | 8170 |

| -continued | | | | | | |
|---|---|---|---|---|---|---|
| Elongation (%) | 44 | 45 | 34 | 40 | 40 | 45 |

Other factors may further improve the impact strength of the compositions, as for instance the introduction of a limited amount of peroxide, which improves the linkage of the rubber. For example, three compositions were prepared by using a sequenced copolymer of styrene and butadiene containing 33% by weight of polybutadiene. Dicumyl peroxide was used in two of the compositions. The improvement in the impact strength, the tensile strength and the flexural strength is shown in Table VII below.

TABLE VII

| Polystyrene | 67.5 | 67.5 | 67.5 |
|---|---|---|---|
| Polybutadiene | 26.5 | 26.5 | 26.5 |
| Sequenced copolymer | 6 | 6 | 6 |
| Peroxide (ppm) | 0 | 200 | 400 |
| Total polybutadiene | 28.5 | 28.5 | 28.5 |
| Total polystyrene | 71.5 | 71.5 | 71.5 |
| Izod (ft. lb/inch) | 4.55 | 7.09 | 6.75 |
| Falling Dart (inch.lb) | 29 | 55 | 55 |
| Ultimate tensile strength (psi) | 2050 | 2330 | 2380 |
| Flexural strength (psi) | 5060 | 5260 | 5480 |

The other mechanical properties also are influenced by the types of rubbery polymers and sequenced copolymers. It is generally known that tensile strength and bending strength decrease when the impact strength increases; however, in some of the foregoing examples, this result is not seen. Therefore, it may be supposed that the simultaneous presence of a particular type of rubbery polymer and a sequenced copolymer creates a synergistic effect and allows the increase of the tensile strength and the bending strength while the impact strength also increases.

In order to further describe and to illustrate the present invention, the following examples are presented:

EXAMPLE 1

A double screw extruder of the Creuzot-Loire type was continuously fed with crystal polystyrene, polybutadiene and a sequenced copolymer of styrene and butadiene of the radial type containing 60% by weight of polybutadiene and having a total molecular weight of 160,000. The flow rates of polystyrene, polybutadiene, and sequenced copolymer were respectively 31.9 kg/hr, 2.9 kg/hr and 1.2 kg/hr. The mass temperature in the double screw extruder was 230° and the residence time was 40 seconds. High impact polystyrene was obtained with the properties set forth below. The amounts of the different constituents are expressed in percent by weight.

| Polystyrene | 88.7 |
|---|---|
| Polybutadiene | 8 |
| Sequenced copolymer | 3.3 |
| Total polybutadiene | 10 |
| Total polystyrene | 90 |
| Izod (ft lb/inch) | 1.39 |
| Falling Dart (inch/lb) | 9 |
| Tensile strength at ultimate (psi) | 3780 |
| Bending strength (psi) | 8460 |
| Elongation (%) | 44 |

EXAMPLE 2

1768 g. of crystal polystyrene, 192 g. of polybutadiene and 40 g. of a sequenced copolymer of styrene-butadiene-styrene wherein the molecular weight of each polystyrene block is 50,000 and the molecular weight of the polybutadiene block is 25,000, were introduced into a mixer. Thereafter 1,000 ppm of cumyl hydroperoxide were added. The constituents were intimately mixed, and a high impact polystyrene was obtained with the following properties:

| Izod (ft lb/inch) | 2.24 |
|---|---|
| Falling Dart (inch/lb) | 17.5 |
| Tensile strength at ultimate (psi) | 3280 |
| Bending strength (psi) | 7920 |
| Elongation (%) | 26 |

EXAMPLE 3

Two high impact polystyrene compositions were prepared wherein the major amount of the rubber introduced into the composition was introduced through the sequenced copolymer.

Composition A 1720 g. of crystal polystyrene, 80 g. of polybutadiene and 200 g. of a sequenced copolymer of styrene and butadiene of the radial type containing 60% by weight of polybutadiene and having a total molecular weight of 160,000, were introduced into a mixer. The constituents were intimately mixed and a high impact polystyrene composition was obtained. The characteristics of that composition are indicated in Table VIII below wherein the amounts of the constituents are expressed in percent by weight.

Composition B 1696 g. of crystal polystyrene, 44 g. of polybutadiene and 260 g. of the sequenced copolymer described in Composition A were introduced into a mixer. The constituents were intimately mixed and a high impact polystyrene composition was obtained. The characteristics of that composition are indicated in Table VIII below wherein the amounts of the constituents are expressed in percent by weight.

TABLE VIII

| | Composition A | Composition B |
|---|---|---|
| Polystyrene | 86 | 84.8 |
| Polybutadiene | 4 | 2.2 |
| Sequenced copolymer | 10 | 13 |
| Total polystyrene | 90 | 90 |
| Total polybutadiene | 10 | 10 |
| Polybutadiene of sequenced | | |
| Total polybutadiene | 60 | 78 |
| Dicumyl peroxide (ppm) | 100 | 100 |
| Izod (ft lb/inch) | 2.14 | 1.82 |
| Falling Dart (inch/lb) | 22 | 17 |
| Tensile strength at ultimate (psi) | 3260 | 3260 |
| Bending strength (psi) | 7580 | 7260 |
| Elongation (%) | 40 | 40 |

What is claimed is:

1. A composition consisting essentially of a mixture of a styrene polymer, a rubbery dienic polymer and a sequenced copolymer of styrene and a diene, the total styrene polymer content which includes the free polystyrene and the polystyrene present in the sequenced copolymer is between 50 and 99% by weight of the composition, the total rubber content, which include the rubbery dienic polymer and the dienic polymer present in the sequenced copolymer, is between 1 and 50% by weight of the composition, the amount of sequenced copolymer being such as to bring to the composition from 3 to 90% by weight of the total rubber in the composition.

2. The composition of claim 1 wherein a peroxide is added to said composition.

3. The composition of claim 2 wherein the amount of said peroxide is no more than 0.5% by weight.

4. The composition of claim 2 wherein said peroxide is selected from the group consisting of cumyl hydroperoxide, tert-butyl hydroperoxide, dicumyl hydroperoxide, and mixtures thereof.

5. The composition of claim 1 wherein the sequenced copolymer contains at least a polystyrene chain and at least a diene polymer chain.

6. The composition of claim 5 wherein said sequenced polymer is one selected from the group consisting of di-block type A-B, ter-block type A-B-A or B-A-B wherein A is a polystyrene chain and B is a polybutadiene chain, radial type copolymers and mixtures thereof.